United States Patent
Yamagishi

(10) Patent No.: US 10,171,854 B2
(45) Date of Patent: Jan. 1, 2019

(54) CONTENT SUPPLY DEVICE, CONTENT SUPPLY METHOD, PROGRAM, TERMINAL DEVICE, AND CONTENT SUPPLY SYSTEM

(71) Applicant: Saturn Licensing LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/785,965

(22) PCT Filed: Jun. 20, 2014

(86) PCT No.: PCT/JP2014/066399
§ 371 (c)(1),
(2) Date: Oct. 21, 2015

(87) PCT Pub. No.: WO2015/001986
PCT Pub. Date: Jan. 8, 2015

(65) Prior Publication Data
US 2016/0080783 A1    Mar. 17, 2016

(30) Foreign Application Priority Data
Jul. 2, 2013   (JP) ................................. 2013-138628

(51) Int. Cl.
*H04N 21/438*   (2011.01)
*H04N 21/242*   (2011.01)
(Continued)

(52) U.S. Cl.
CPC ....... *H04N 21/242* (2013.01); *H04N 21/2343* (2013.01); *H04N 21/2356* (2013.01);
(Continued)

(58) Field of Classification Search
CPC .................................................. H04N 21/4384
See application file for complete search history.

(56) References Cited

U.S. PATENT DOCUMENTS

2011/0125918 A1    5/2011  Ha et al.
2011/0125919 A1    5/2011  Kwon et al.
(Continued)

FOREIGN PATENT DOCUMENTS

CN    102812666 A    12/2012
CN    102812674 A    12/2012
(Continued)

OTHER PUBLICATIONS

Iraj Sodagar, "Overview of MPEG-DASH, ISO/IEC 23009-1, Dynamic Adaptive Streaming over HTTP", Aug. 11, 2011.*
(Continued)

*Primary Examiner* — Nicholas T Corbo
(74) *Attorney, Agent, or Firm* — Oblon, McClelland, Maier & Neustadt, L.L.P.

(57) ABSTRACT

The present disclosure relates to a content supply device, a content supply method, a program, a terminal device, and a content supply system, which are capable of performing rapid zapping between channels. A content supply device according to an aspect of the present disclosure includes a first supply unit configured to generate a zapping stream by delimiting streaming data according to a timing and a duration in common with another channel and to supply the zapping stream to a reception side via a network, a second supply unit configured to generate a viewing stream by delimiting the streaming data according to a duration of an integer multiple of the duration of the zapping stream and to supply the viewing stream to the reception side via the network, and a metafile generating unit configured to generate a metafile that is for the reception side to receive the zapping stream and the viewing stream. The present disclo-
(Continued)

```
<MPD>
 <Period>
  <AdaptationSet unsymmetricallyAlignedGroupTo=' Ax' >
   <Representation id=' A1z' />
   <Representation id=' A2z' />
  </AdaptationSet>
  <AdaptationSet unsymmetricallyAlignedGroupFrom=' Ax' >
   <Representation id=' A1' />
   <Representation id=' A2' />
   <Representation id=' A3' />
   <Representation id=' A4' />
   <Representation id=' A5' />
  </AdaptationSet>
 </Period>
</MPD>
``` sure can be applied to a system in which content is delivered in a streaming manner.

16 Claims, 17 Drawing Sheets

(51) Int. Cl.

| | | |
|---|---|---|
| *H04N 21/2343* | (2011.01) | |
| *H04N 21/235* | (2011.01) | |
| *H04N 21/61* | (2011.01) | |
| *H04N 21/6373* | (2011.01) | |
| *H04N 21/845* | (2011.01) | |
| *H04N 21/2662* | (2011.01) | |
| *H04N 21/262* | (2011.01) | |
| *H04N 21/858* | (2011.01) | |
| *H04N 21/643* | (2011.01) | |
| *H04N 21/238* | (2011.01) | |
| *H04N 21/2385* | (2011.01) | |

(52) U.S. Cl.
CPC ... *H04N 21/23439* (2013.01); *H04N 21/2662* (2013.01); *H04N 21/4384* (2013.01); *H04N 21/6125* (2013.01); *H04N 21/6373* (2013.01); *H04N 21/8456* (2013.01); *H04N 21/235* (2013.01); *H04N 21/238* (2013.01); *H04N 21/2353* (2013.01); *H04N 21/2385* (2013.01); *H04N 21/262* (2013.01); *H04N 21/643* (2013.01); *H04N 21/845* (2013.01); *H04N 21/858* (2013.01)

(56) References Cited

U.S. PATENT DOCUMENTS

| | | | | |
|---|---|---|---|---|
| 2012/0259994 | A1* | 10/2012 | Gillies | H04L 12/1881 709/231 |
| 2013/0294747 | A1 | 11/2013 | Takahashi | |
| 2014/0019587 | A1* | 1/2014 | Giladi | H04L 29/06476 709/217 |
| 2014/0219346 | A1* | 8/2014 | Ugur | H04N 19/00575 375/240.12 |
| 2015/0089074 | A1* | 3/2015 | Oyman | H04L 65/608 709/231 |
| 2015/0100702 | A1* | 4/2015 | Krishna | H04N 21/23439 709/231 |
| 2015/0271179 | A1* | 9/2015 | Wang | H04L 63/10 726/30 |
| 2015/0271237 | A1* | 9/2015 | Stockhammer | H04N 21/234 709/219 |
| 2015/0373077 | A1* | 12/2015 | Ramamurthi | H04W 36/14 709/219 |

FOREIGN PATENT DOCUMENTS

| | | |
|---|---|---|
| EP | 2 637 414 A2 | 9/2013 |
| EP | 3 016 396 A1 | 5/2016 |
| JP | 2009-284283 A | 12/2009 |
| WO | 2012/096372 A1 | 7/2012 |
| WO | WO 2012/138909 A1 | 10/2012 |

OTHER PUBLICATIONS

Christian Timmerer, "Dynamic Adaptive Streaming over HTTP: From Content Creation to Consumption", Nov. 2, 2012.*
Thomas Stockhammer, "MPEG's Dynamic Adaptive Streaming over HTTP (DASH)—Enabling Formats for Video Streaming over the Open Internet", Jan. 22, 2011.*
International Search Report issued Sep. 9, 2014 in PCT/JP2014/066399.
Mitsuhiro Hirabayashi, "Achieving Uninterrupted Video Streaming Using Existing Web Servers," Nikkei Electronics, Mar. 19, 2012, pp. 77-85.
Extended European Search Report dated Feb. 7, 2017 for Application No. 14818853.5, 10 pages.
Alex Giladi low-latency live broadcast support in DASH, 102. MPEG Meeting; Oct. 15, 2012-Oct. 19, 2012; Shanghai; (Motion Picture Expert Group or ISO/IEC JTC1/SC29/WG11), No. m26652, Oct. 12, 2012, 6 pages.
Thomas Stockhammer, Technologies Under Consideration for ISO/IED 23009-1 Dynamic Adaptive Streaming over HTTP, ISO/IEC JTC1/SC29/WG11 MPEG2011/N12682, Nov. 2011, Geneva Switzerland, pp. 1-18.
Mitsuzo Hirabayashi, "Realizing Uninterrupted Video Distribution with Existing Web Servers" NIKKEI Electronics, 2012, 21 pages (original reference previously filed submitting English translation only).
Chinese Office Action issued in Chinese Patent Application No. 201480036711.2 dated Jan. 29, 2018.

* cited by examiner

FIG.6

```
<MPD ......>
<Period ......>
<AdaptationSet>
<Representation ......>
 ......
<BaseURL>http://example.com/counter-10mr_avc_dash.mp4</BaseURL>
<SegmentList ......>
 ......
<SegmentURL mediaRange="795-83596"/>
<SegmentURL mediaRange="83597-166046"/>
<SegmentURL mediaRange="166047-248857"/>
<SegmentURL mediaRange="248858-331477"/>
 ......
</MPD>
```

FIG.7

```
<MPD...NTPSynchronized="true" SegmentAlignedGroupID="GROUP IDENTIFIER" >
...
</MPD>
```

FIG. 13

```
<MPD>
 <Period>
  <AdaptationSet unsymmetricallyAlignedGroupTo=' Ax' >
    <Representation id=' A1z' />
    <Representation id=' A2z' />
  </AdaptationSet>
   <AdaptationSet unsymmetricallyAlignedGroupFrom=' Ax' >
    <Representation id=' A1' />
    <Representation id=' A2' />
    <Representation id=' A3' />
    <Representation id=' A4' />
    <Representation id=' A5' />
  </AdaptationSet>
 </Period>
</MPD>
```

FIG. 16

```
<MPD>
 <Period>
  <AdaptationSet unsymmetricallyAlignedGroupTo=' Ax' >
   <Representation id=' A1z' />
   <Representation id=' A2z' />
  </AdaptationSet>
  <AdaptationSet unsymmetricallyAlignedGroupTo=' Ax' >
   <Representation id=' AA1z' />
   <Representation id=' AA2z' />
  </AdaptationSet>
  <AdaptationSet unsymmetricallyAlignedGroupFrom=' Ax' >
   <Representation id=' A1' />
   <Representation id=' A2' />
   <Representation id=' A3' />
   <Representation id=' A4' />
   <Representation id=' A5' />
  </AdaptationSet>
 </Period>
</MPD>
```

CONTENT SUPPLY DEVICE, CONTENT SUPPLY METHOD, PROGRAM, TERMINAL DEVICE, AND CONTENT SUPPLY SYSTEM

TECHNICAL FIELD

The present disclosure relates to a content supply device, a content supply method, a program, a terminal device, and a content supply system, and more particularly, to a content supply device, a content supply method, a program, a terminal device, and a content supply system, which are capable of rapidly zapping content that is HTTP-delivered.

BACKGROUND ART

Moving Picture Experts Group-Dynamic Adaptive Streaming over HTTP (hereinafter, referred to as "DASH") (MPEG-DASH) using the same HTTP as browsing of a web site as an internationally standardized moving image delivery protocol available for moving image delivery via the Internet has been known (for example, see Non-Patent Literature 1).

DASH implements adaptive streaming technology. In other words, a content supply side is content of the same subject, and an image quality, an angle of view size, or the like changes according to a communication environment of the Internet serving as a delivery path or a capability or a state of a reception side. A plurality of streams that differ in bit rate are prepared. On the other hand, the reception side can select an optimal stream among the plurality of streams prepared by the supply side according to the communication environment of the Internet, the decoding capability of the reception side, or the like and acquire and reproduce the selected optimal stream.

As described above, in DASH, a metafile called a media presentation description (MPD) is supplied from the supply side to the reception side so that the reception side can adaptively select, receive, and reproduce a stream.

An address (url information) of a supply source of streaming data (media data such as audio/video/subtitle) of content divided into chunks is described in the MPD. The reception side can access a server serving as a content supply source based on the url information of the MPD, requests streaming data, and receives and reproduce streaming data HTTP-delivered according to the request.

FIG. 1 illustrates an example of a configuration of a content supply system that delivers content in a streaming manner based on the DASH.

A content supply system 10 includes a plurality of content supply devices 20 (in this case, 20A, 20B, and 20C) of a side at which content is supplied and a plurality of DASH clients 30 of a side at which content is received.

The content supply device 20A delivers content of the same subject through a plurality of streams having different bit rates as a channel A. Similarly, the content supply device 20B delivers content of the same subject different from content of the channel A through a plurality of streams having different bit rates as a channel B. The same applies to the content supply device 20C. Hereinafter, when it is unnecessary to distinguish the content supply devices 20A, 20B, and 20C individually, the content supply device is referred to simply as a "content supply device 20.

The content supply device 20 includes a content management server 21, a DASH segment streamer 22, and a DASH MPD server 23.

The content management server 21 manages source data of content to be supplied to the DASH client 30, generates a plurality of pieces of streaming data having different bit rates as content of the same subject, and outputs the generated streaming data to the DASH segment streamer 22. The DASH segment streamer 22 generates a segment stream by temporally dividing each piece of streaming data into segments, and holds the segment stream as a file. The DASH segment streamer 22, as a HTTP server, HTTP-delivers the held file of the segment stream to the supply source in response to a request from the DASH client 30. The DASH segment streamer 22 notifies the DASH MPD server 23 of an address of the supply source of the file of the segment stream.

The DASH MPD server 23 generates an MPD in which, for example, the address indicating the supply source of the file of the segment stream is described, and HTTP-delivers the MPD in response to the request from the DASH client 30 of the reception side.

The DASH client 30 is connected to the content supply device 20 via the Internet 11, requests the DASH MPD server 23 to transmit the MPD, and acquires the MPD that is HTTP-delivered. The DASH client 30 requests the DASH segment streamer 22 to transmit the streaming data based on the MPD, and receives and reproduces the file that is HTTP-delivered in response to the request.

A cache server (not illustrated) that can replace the DASH MPD server 23 or the DASH segment streamer 22 is also provided on the Internet 11.

CITATION LIST

Non-Patent Literature

Non-Patent Literature 1: Mitsuhiro Hirabayashi, "Achieving Uninterrupted Video Streaming Using Existing Web Servers," NIKKEI ELECTRONICS, Mar. 19, 2012

SUMMARY OF INVENTION

Technical Problem

As described above, in DASH, an adaptive streaming technique using HTTP-unicast delivery is implemented, and in the content supply system of FIG. 1, a plurality of content supply devices 20 corresponding to the respective channels are prepared, and thus the reception side can select a plurality of channels and receive delivery of content.

As described above, when it is possible to select a plurality of channels, the viewer is expected to perform so-called zapping (an operation of switching a channel one after another within a short time and searching for content to be viewed), similarly to when viewing a television broadcast.

In DASH, switching of reception of a segment stream is performed in units of segments or in units of sub segments obtained by subdividing a segment. Hereinafter, a description continues under the assumption that in DASH, switching between channels is performed in units of segments.

FIGS. 2 and 3 illustrate that three segment streams (representations) having different bit rates serving as content of the same subject in channels A, B, and C of DASH are prepared, and illustrate switching examples when zapping between channels is performed at the reception side.

In DASH, since a segment length is arbitrary, channels need not necessarily have the same segment length. Further, channels need not necessarily have the same reproduction start time of a segment at the head of content.

FIG. 2 illustrates an example in which channels have neither the same segment length nor the same reproduction start time of the segment at the head of content.

In the case of the example of FIG. 2, although the user of the DASH client 30 gives an instruction to perform switching (zapping) to a representation B2 of a channel B before T1 on a DASH client time axis while viewing a representation A2 of a channel A, the switching is delayed until T2 serving as a segment delimiter of the representation B2. Further, although the user gives an instruction to perform switching to a representation C2 of a channel C before T3 while viewing the representation B2 of the channel B, the switching is delayed until T4 serving as a segment delimiter of the representation C2.

FIG. 3 illustrates an example in which channels do not have the same segment length, but the reproduction start times of the segments at the head of content are matched in synchronization with an NTP time axis.

In the example of FIG. 3, even if the user of the DASH client 30 gives an instruction to perform switching to the representation B2 of the channel B before T1 on the NTP time axis while viewing the representation A2 of the channel A, the switching is delayed until T2 serving as a segment delimiter of the representation B2. Further, even if the user gives an instruction to perform switching to the representation C2 of the channel C before T3 while viewing the representation B2 of the channel B, the switching is delayed until T4 serving as a segment delimiter of the representation C2.

As described above, in DASH, when a segment stream is switched between channels, an extra delay occurs. Thus, in this case, it is difficult to perform rapid zapping between channels.

Further, the occurrence of the above-described delay can be suppressed by reducing the segment length of the segment stream of each channel to be extremely small. However, in this case, coding efficiency deteriorates, a data amount of a segment stream increases, and a wide communication band is necessary, and thus an excessive load is put on the Internet 11, and service quality is likely to deteriorate.

The present disclosure was made in light of the foregoing, and it is desirable to implement rapid zapping between channels.

Solution to Problem

According to a first aspect of the present disclosure, there is provided a content supply device that supplies a plurality of pieces of streaming data that include content of a same subject and differ in bit rate through a same channel, according to an adaptive streaming technique, the content supply device including: a first supply unit configured to generate a zapping stream by delimiting the streaming data according to a timing and a duration in common with another channel and to supply the zapping stream to a reception side via a network; a second supply unit configured to generate a viewing stream by delimiting the streaming data according to a duration of an integer multiple of the duration of the zapping stream and to supply the viewing stream to the reception side via the network; and a metafile generating unit configured to generate a metafile that is for the reception side to receive the zapping stream and the viewing stream.

The metafile generating unit can generate the metafile including an attribute indicating that a minimum unit of the zapping stream is aligned with a minimum unit of the viewing stream.

The metafile generating unit can generate the metafile including an attribute indicating that a minimum unit of the viewing stream is asymmetrically aligned with a minimum unit of the zapping stream.

The metafile generating unit can generate an extended MPD by introducing an attribute indicating that AdaptationSet corresponding to the viewing stream is asymmetrically aligned with AdaptationSet corresponding to the zapping stream.

The attribute can include AdaptationSet/@unsymmetricallyAlignedGroupFrom and AdaptationSet/@unsymmetricallyAlignedGroupFromTo.

According to the first aspect of the present disclosure, there is provided a content supply method of a content supply device that supplies a plurality of pieces of streaming data that include content of a same subject and differ in bit rate through a same channel, according to an adaptive streaming technique, the content supply method including: a first supply step of generating, by the content supply device, a zapping stream by delimiting the streaming data according to a timing and a duration in common with another channel and supplying the zapping stream to a reception side via a network; a second supply step of generating, by the content supply device, a viewing stream by delimiting the streaming data according to a duration of an integer multiple of the duration of the zapping stream and supplying the viewing stream to the reception side via the network; and a metafile generating step of generating, by the content supply device, a metafile that is for the reception side to receive the zapping stream and the viewing stream.

According to the first aspect of the present disclosure, there is provided a program causing a computer that supplies a plurality of pieces of streaming data that include content of a same subject and differ in bit rate through a same channel, according to an adaptive streaming technique to function as: a first supply unit configured to generate a zapping stream by delimiting the streaming data according to a timing and a duration in common with another channel and to supply the zapping stream to a reception side via a network; a second supply unit configured to generate a viewing stream by delimiting the streaming data according to a duration of an integer multiple of the duration of the zapping stream and to supply the viewing stream to the reception side via the network; and a metafile generating unit configured to generate a metafile that is for the reception side to receive the zapping stream and the viewing stream.

In the first aspect of the present disclosure, a zapping stream is generated by delimiting the streaming data according to a timing and a duration in common with another channel, and the zapping stream is supplied to a reception side via a network. A viewing stream is generated by delimiting the streaming data according to a duration of an integer multiple of the duration of the zapping stream, and the viewing stream is supplied to the reception side via the network. A metafile that is for the reception side to receive the zapping stream and the viewing stream is generated.

According to a second aspect of the present disclosure, there is provided a terminal device that receives a plurality of pieces of streaming data supplied from a content supply device that supplies the streaming data through a same channel, according to an adaptive streaming technique, the streaming data including content of a same subject and differing in bit rate. The content supply device includes a first supply unit configured to generate a zapping stream by delimiting the streaming data according to a timing and a duration in common with another channel and to supply the zapping stream to the terminal device via a network, a second supply unit configured to generate a viewing stream by delimiting the streaming data according to a duration of an integer multiple of the duration of the zapping stream and to supply the viewing stream to the terminal device via the network, and a metafile generating unit configured to generate a metafile that is for the terminal device to receive the zapping stream and the viewing stream. The terminal device is configured to acquire the metafile, and to receive the zapping stream and the viewing stream supplied through the same channel, based on the acquired metafile.

The terminal device can switch reception of the zapping stream and the viewing stream supplied through the same channel, based on the acquired metafile.

In the second aspect of the present disclosure, the metafile is acquired, and the zapping stream and the viewing stream supplied through the same channel are received based on the acquired metafile.

According to a third aspect of the present disclosure, there is provided a content supply system including: a content supply device configured to supply a plurality of pieces of streaming data that include content of a same subject and differ in bit rate through a same channel, according to an adaptive streaming technique; and a terminal device configured to receive the streaming data. The content supply device includes a first supply unit configured to generate a zapping stream by delimiting the streaming data, according to a timing and a duration in common with another channel and to supply the zapping stream to the terminal device via a network, a second supply unit configured to generate a viewing stream by delimiting the streaming data according to a duration of an integer multiple of the duration of the zapping stream and to supply the viewing stream to the terminal device via the network, and a metafile generating unit configured to generate a metafile that is for the terminal device to receive the zapping stream and the viewing stream. The terminal device is configured to acquire the metafile, and to receive the zapping stream and the viewing stream supplied through the same channel, based on the acquired metafile.

In the third aspect of the present disclosure, the content supply device generates a zapping stream by delimiting the streaming data according to a timing and a duration in common with another channel and supplies the zapping stream to a reception side via a network. The content supply device generates a viewing stream by delimiting the streaming data according to a duration of an integer multiple of the duration of the zapping stream and supplies the viewing stream to the reception side via the network. The content supply device generates a metafile that is for the reception side to receive the zapping stream and the viewing stream. The terminal device acquires the metafile, and receives the zapping stream and the viewing stream supplied through the same channel based on the acquired metafile.

Advantageous Effects of Invention

According to the first to third aspects of the present disclosure, it is possible to implement rapid zapping between channels.

BRIEF DESCRIPTION OF DRAWINGS

FIG. 6 is a diagram illustrating an example in which an MPD is described in an XML format.
FIG. 7 is a diagram illustrating an example in which an extended MPD is described in an XML format.
FIG. 13 is a diagram illustrating an exemplary zapping-viewing combined MPD corresponding to FIG. 12.
FIG. 16 is a diagram illustrating an exemplary zapping-viewing combined MPD corresponding to FIG. 15.

DESCRIPTION OF EMBODIMENTS

Hereinafter, preferred modes (hereinafter, referred to as "embodiments") for carrying out the present disclosure will be described, and an overview of the present disclosure will be first described with reference to FIG. 4.

Figure 1:
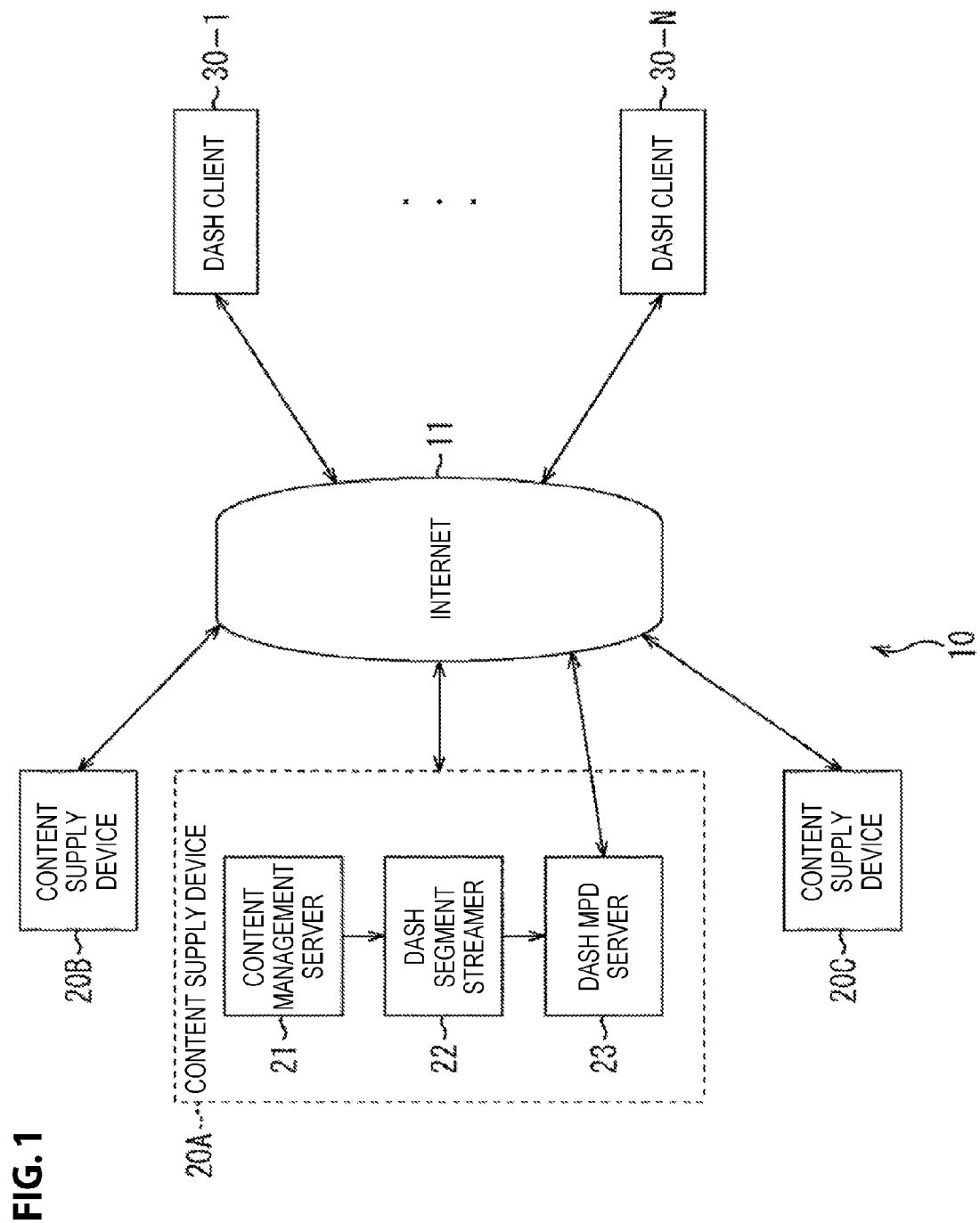
FIG. 1 is a block diagram illustrating an example of a configuration of a content supply system of the related art.
Figure 2:
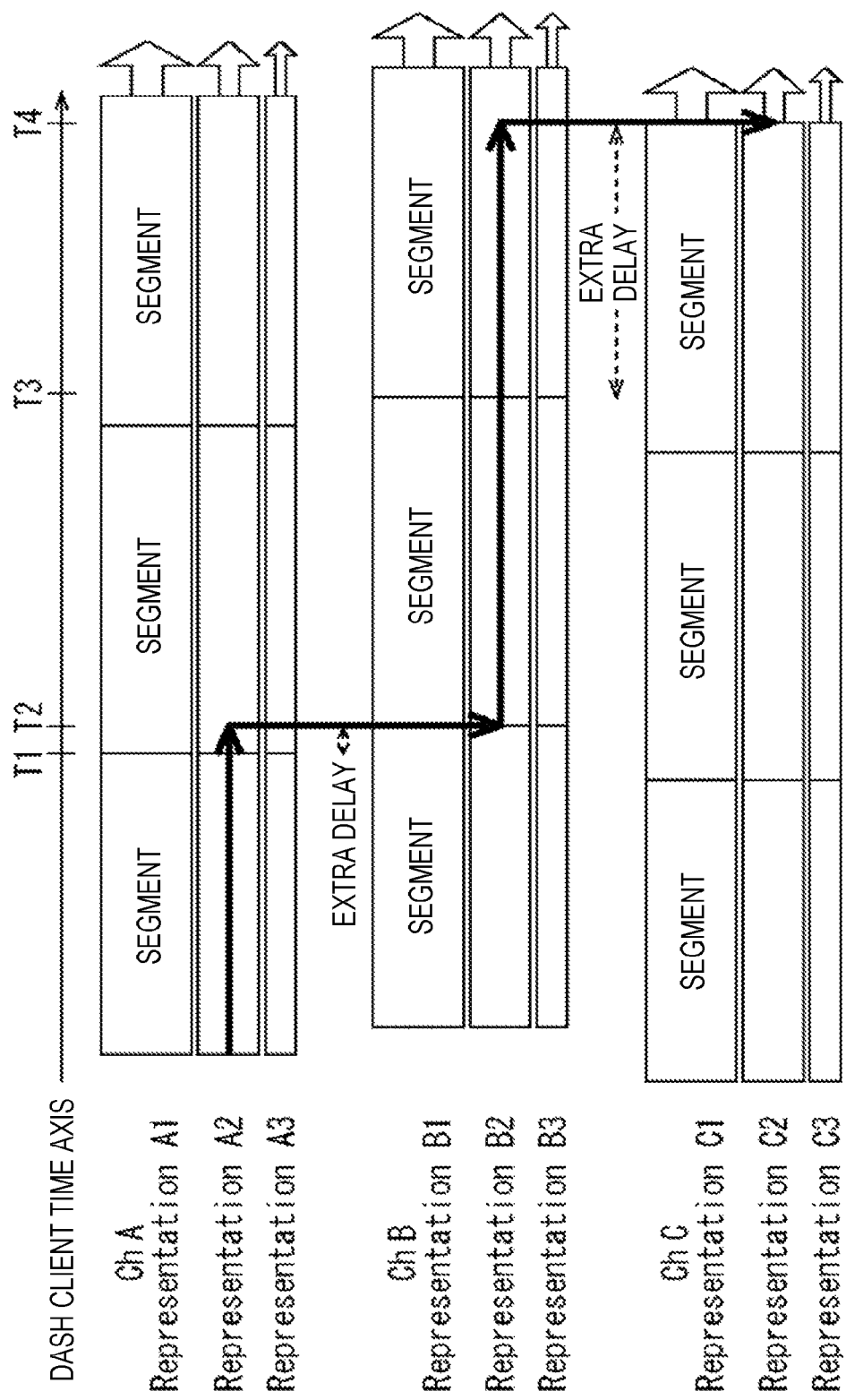
FIG. 2 is a diagram for describing a delay occurring due to switching between channels.
Figure 3:
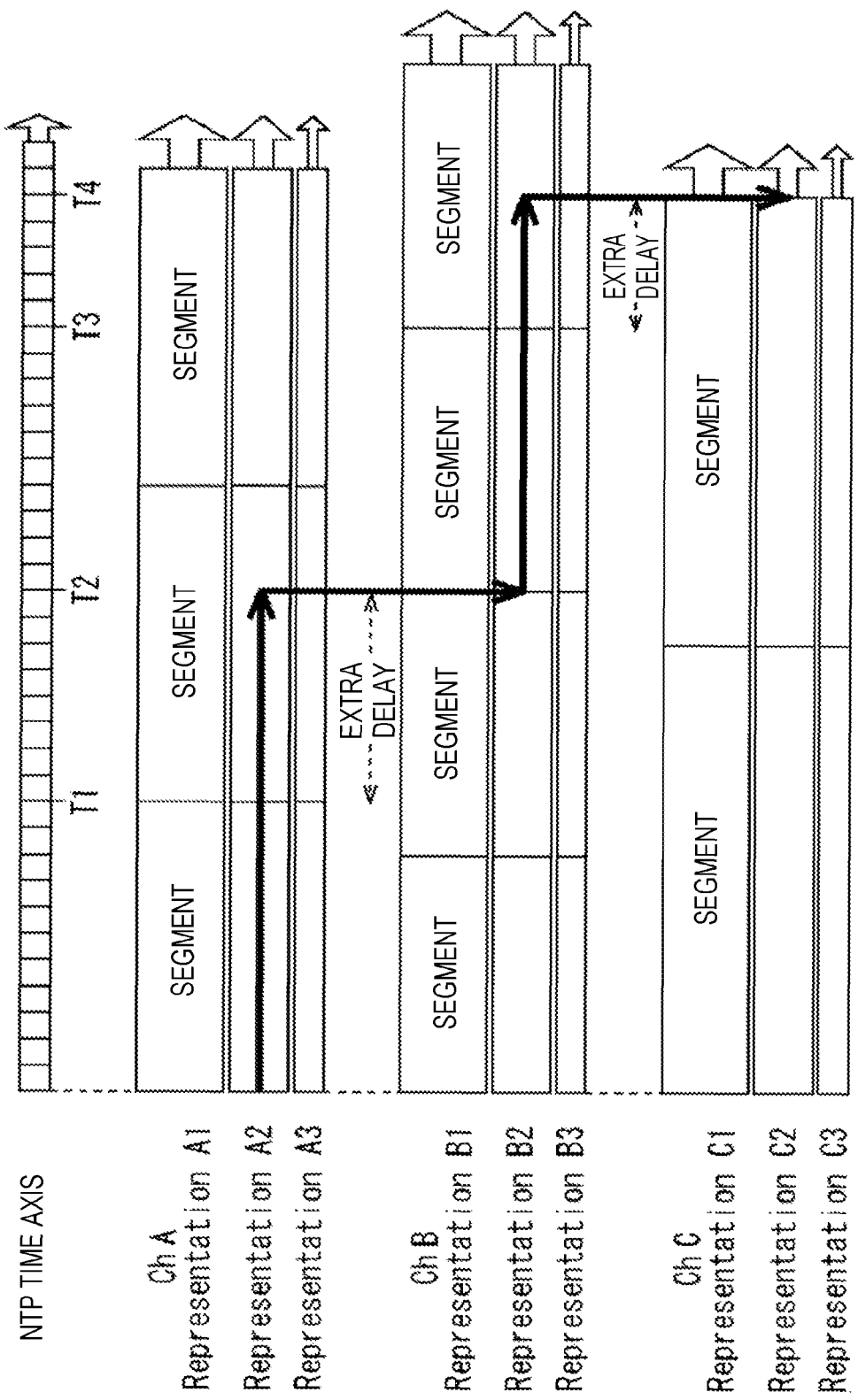
FIG. 3 is a diagram for describing a delay occurring due to switching between channels.
Figure 4:
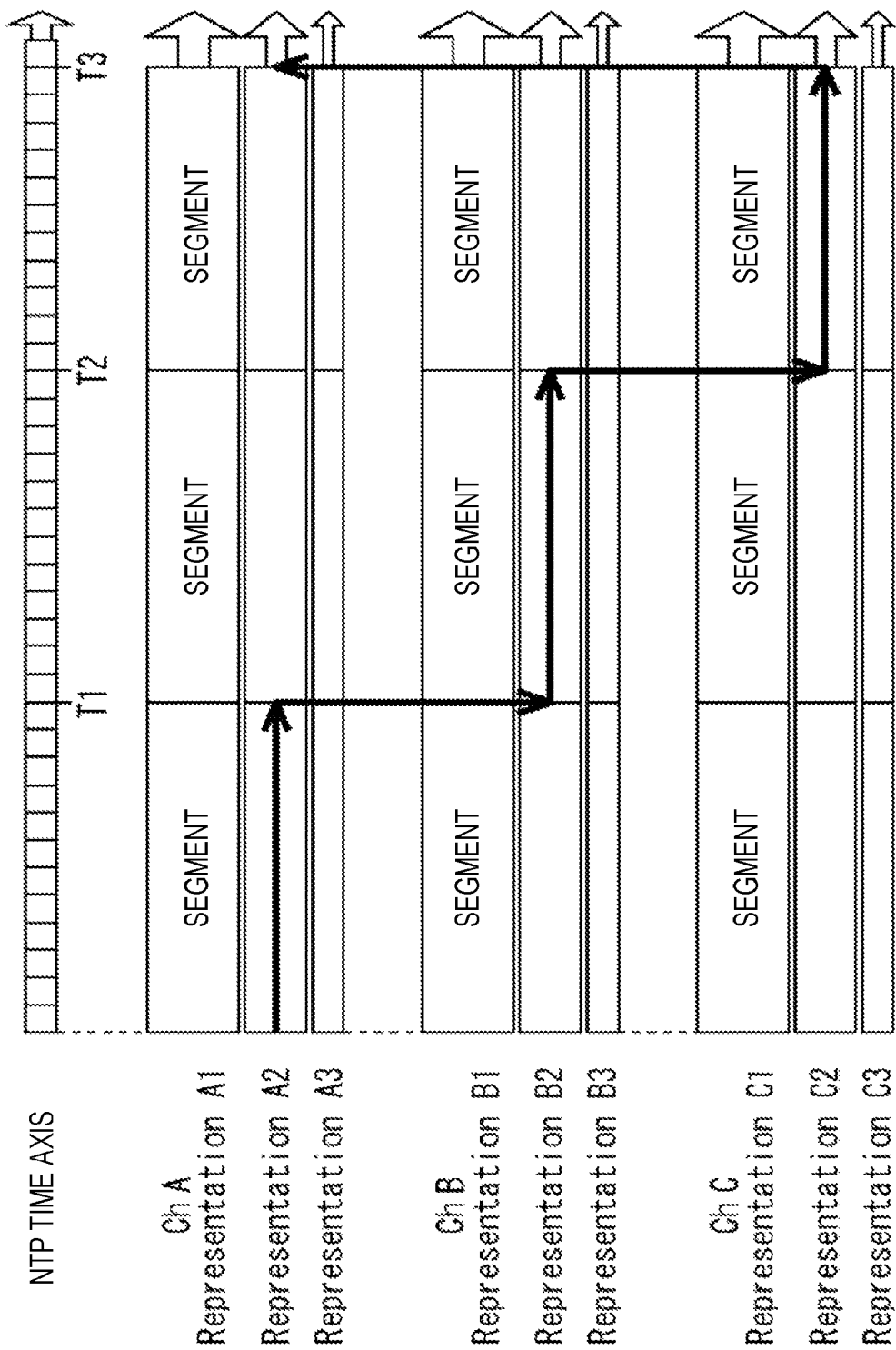
FIG. 4 is a diagram for describing an overview of the present disclosure.

FIG. 4 illustrates a switching example in which zapping is performed among a plurality of channels delivering a segment stream of content in a content supply system according to an embodiment of the present disclosure.

FIG. 4 illustrates that different content is delivered in the channels A, B, and C, and three segment streams (representations) having different bit rates are prepared in each channel.

In the content supply system to which the present disclosure is applied, a segment delimiter of a segment stream is synchronized with an NTP time axis, and segment lengths of respective channels belonging to a predetermined group are set to one common duration. Further, starting points (MPD/@availabilityStartTime+Period/@start) of media reproduction times at the head of segments are set to be matched on the NTP time axis.

As the above setting is performed, when the viewer using the content supply system gives an instruction to perform switching to the representation B2 of the channel B before T1 on the DASH client time axis while viewing the representation A2 of the channel A, the switching is performed at T1 serving as both the segment delimiter of the representation A2 and the segment delimiter of the representation B2 as illustrated in FIG. 4. Further, when the viewer gives an instruction to perform switching to the representation C2 of the channel C before T2 while viewing the representation B2 of the channel B, the switching is performed at T2 serving as both the segment delimiter of the representation B2 and the segment delimiter of the representation C2. Moreover, when the viewer gives an instruction to perform switching to the representation A2 of the channel A before T3 while viewing the representation C2 of the channel C, the switching is performed at T3 serving as both the segment delimiter of the representation C2 and the segment delimiter of the representation A2.

As described above, in the present embodiment, it is possible to perform zapping rapidly between channels belonging to the same group without an extra delay.

In FIG. 4, each channel delivers three segment streams (representations) having different bit rates, but in the content supply system according to an embodiment of the present disclosure, one or more zapping streams and two or more viewing streams are prepared for content of the same subject in each channel. Further, in channels belonging to the same group, the reproduction start times of the segments at the head of content in the respective channels are set to be matched in synchronization with an NTP time so that the zapping segment streams of the channels have the same segment length.

[Exemplary Configuration of Content Supply System]

Figure 5:
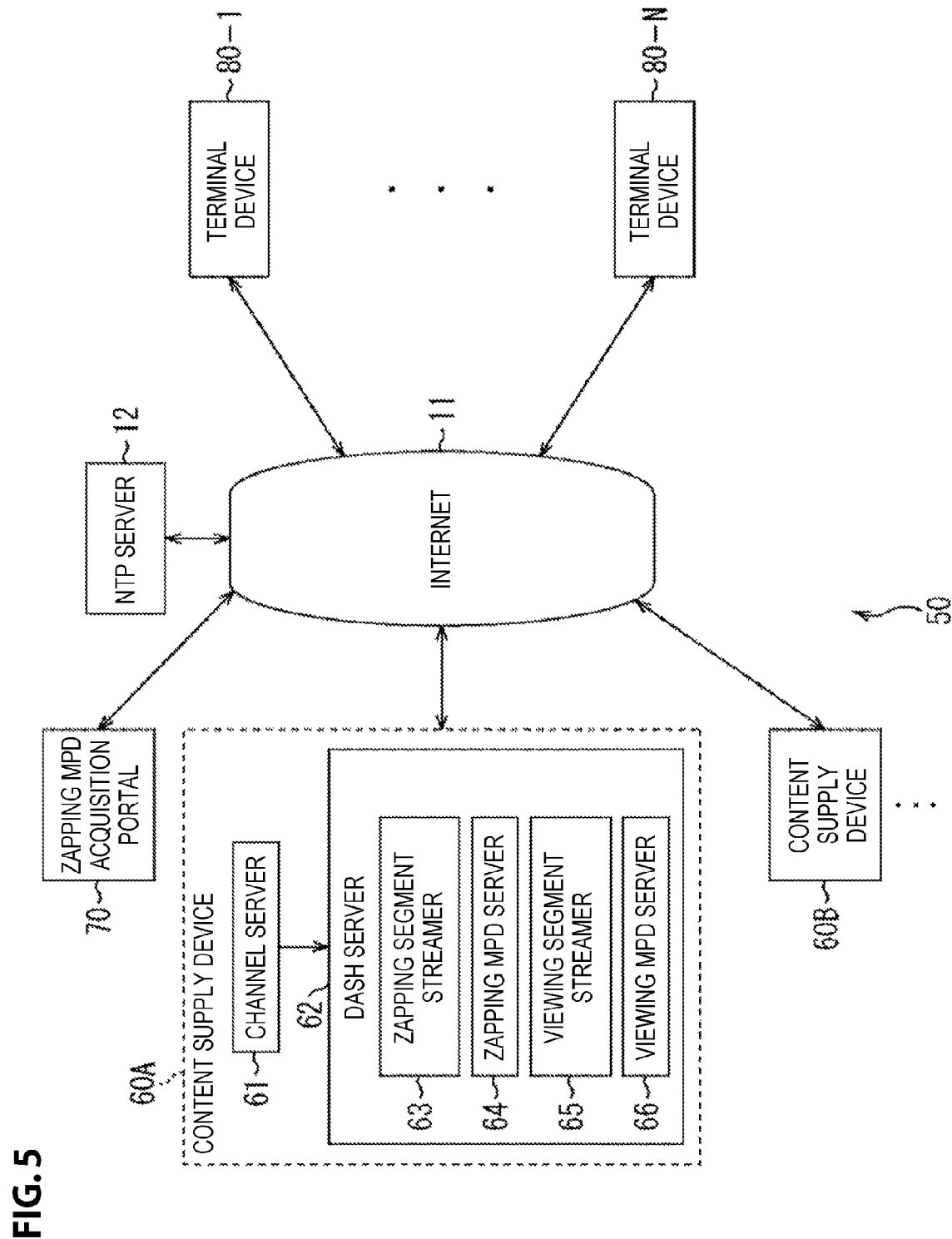
FIG. 5 is a block diagram illustrating an exemplary configuration of a content supply system to which the present disclosure is applied.

FIG. 5 illustrates an exemplary configuration of a content supply system according to an embodiment of the present disclosure.

A content supply system 50 is configured such that a plurality of content supply devices 60 corresponding to the respective channels, a zapping MPD acquisition portal 70, and a plurality of terminal devices 80 are connected via the Internet 11.

An NTP server 12 that provides system time information according to a UTC time format is disposed on the Internet 11. The content supply devices 60 and the terminal devices 80 are assumed to operate in synchronization with the NTP time axis according to the system time information provided from the NTP server 12.

The content supply device 60A corresponding to the channel A includes a channel server 61 and a DASH server 62.

The channel server 61 manages source data of content to be delivered as the channel A, generates a plurality of pieces of streaming data (one or more pieces of zapping streaming data and two or more pieces of viewing streaming data) having different bit rates from the source data of the same subject, and supplies the generated streaming data to the DASH server 62.

The DASH server 62 includes a zapping segment streamer 63, a zapping MPD server 64, a viewing segment streamer 65, and a viewing MPD server 66.

The zapping segment streamer 63 generates a zapping segment stream by temporally delimiting zapping streaming data into periods and further dividing a period into segments, and holds the segments as a file. The segment length of the zapping segment stream is smaller than the segment length of the viewing segment stream, and has a common duration with another channel belonging to the same group. Since the zapping segment streamer 63 operates in synchronization with the NTP time axis, the segment delimiter of the zapping segment stream is synchronized with the NTP time axis as well.

The zapping segment streamer 63 notifies the zapping MPD server 64 of the address serving as the supply source of the held file of the zapping segment stream. The zapping segment streamer 63, as the web server, HTTP-unicast-delivers the file of the zapping segment stream to the request source via the Internet 11 according to the request from the terminal device 80.

The zapping MPD server 64 generates an MPD (hereinafter, referred to as a "zapping MPD." The details thereof will be described below) that is extended for zapping and necessary when the terminal device 80 side receives the zapping segment stream. Within the group to which the channel of the content supply device 60 belongs, starting points (MPD/@availabilityStartTime+Period/@start) of the media reproduction times at the head of the segments are matched on the NTP time axis.

The zapping MPD server 64, as the web server, supplies the zapping MPD to the zapping MPD acquisition portal 70 according to crawling by the zapping MPD acquisition portal 70.

The viewing segment streamer 65 generates a viewing segment stream by temporally delimiting viewing streaming data into periods and further dividing a period into segments, and holds the segments as a file. The segment delimiter of the viewing segment stream is matched with the segment delimiter of the zapping segment stream. The segment length of the viewing segment stream is, however, larger than the segment length of the zapping segment stream and may be set to an integer multiple of the segment length of the zapping segment stream, for example. Thus, it is possible not only to efficiently encode the zapping segment stream but also to rapidly perform switching between the zapping segment stream and the viewing segment stream of the same channel.

The viewing segment streamer 65 notifies the viewing MPD server 66 of the address serving as the supply source of the held file of the viewing segment stream. The viewing segment streamer 65, as the web server, HTTP-unicast-P-delivers the file of the viewing segment stream via the Internet 11 according to the request from the terminal device 80.

The viewing MPD server 66 generates a viewing MPD that is necessary when the terminal device 80 side receives the viewing segment stream, and, as the web server, HTTP-unicast-delivers the zapping MPD to the supply source via the Internet 11 according to the request from the terminal device 80.

The zapping MPD generated by the zapping MPD server 64 and the viewing MPD generated by the viewing MPD server 66 correspond to content of the same subject and are explicitly associated with each other, for example, through a URL of an acquisition destination. Specifically, for example, when the URL of the acquisition destination of the zapping MPD is http://a.com/channel_1.forZapping.mpd, the URL of the acquisition destination of the viewing MPD is regarded to be http://a.com/channel_1.mpd or the like.

The content supply device 60B corresponding to the channel B has a similar configuration to the content supply device 60A, and thus a description thereof is omitted. There may be a plurality of content supply devices 60X (not illustrated) corresponding to X channels rather than the channels A and B.

The zapping MPD acquisition portal 70 crawls the content supply devices 60 of the respective channels according to the query API requesting the zapping MPD from the terminal device 80, collects the zapping MPDs, and transmits the zapping MPDs to the terminal device 80. When no zapping MPD is generated by the content supply devices 60 of the respective channels, the viewing MPD satisfying a predetermined condition (which will be described below) is collected and transmitted to the terminal device 80.

[Extension of MPD]

Next, the MPD in the DASH and an extension thereof will be described.

In the MPD, information related to content (Media) is divided into units of periods. In each period, a plurality of representations including information related to streaming data of the same subject that differs in image quality or an angle of view size and differs in a stream attribute such as a bit rate are prepared. The representation stores information related to a segment obtained by further temporally dividing a period.

FIG. 6 illustrates an example in which the structure below the representation is described in an XML format.

Figure 8:
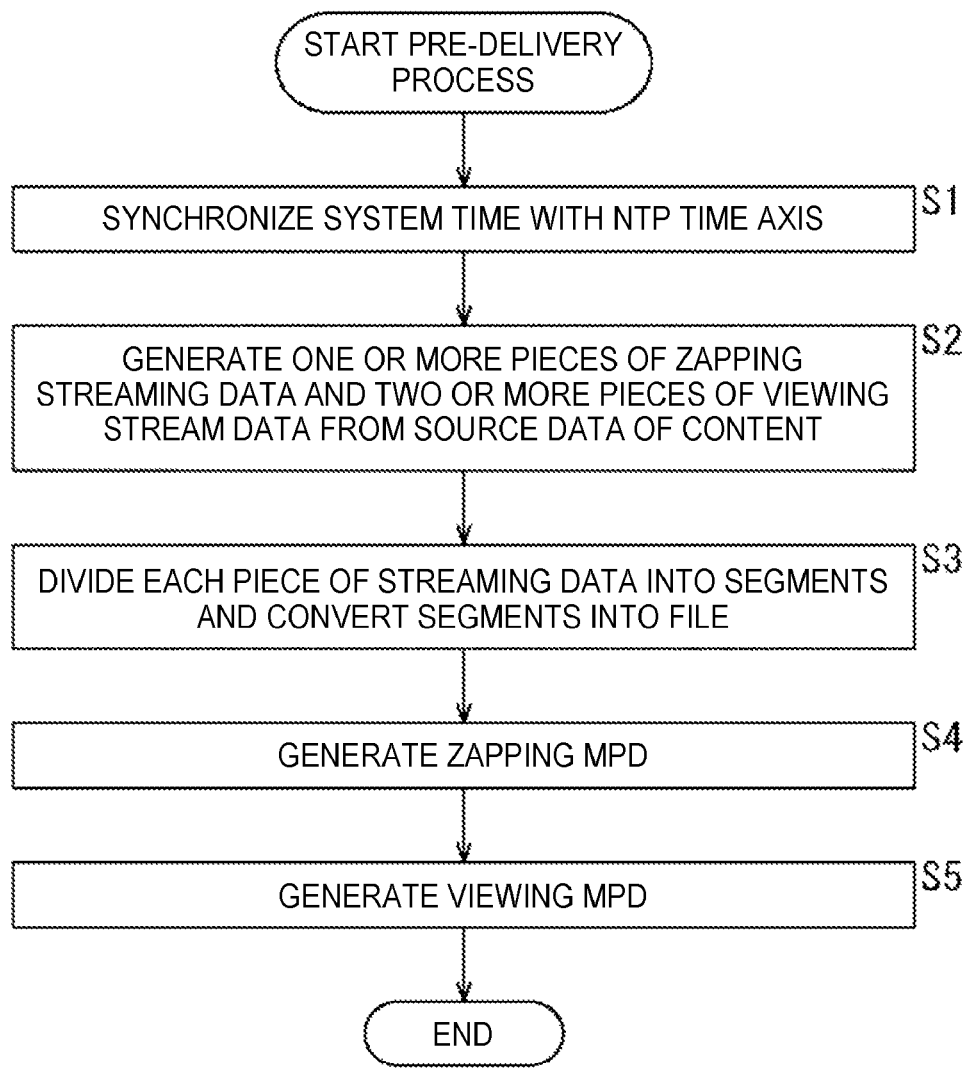
FIG. 8 is a flowchart for describing a pre-delivery process.

In FIG. 8, "http://example.com/counter-10mn_avc_dash.mp4" described in MPD/Period/AdaptationSet/Representation/BaseURL indicates the address of the supply source of the file into which a plurality of segments are collectively converted.

MPD/Period/AdaptationSet/Representation/SegmentList/SegmentURL/@mediaRange indicates a byte range of each segment in the file.

For example, MPD/Period/AdaptationSet/Representation/SegmentList/SegmentURL/@mediaRange="795-83596" indicates that a byte range of a 795-th byte to an 83596-th byte in a file is a first segment of a segment stream.

Thus, when the terminal device 80 acquires the first segment of the segment stream, it is desirable to designate a mediaRange "795-83596" to a range header together with a url "http://example.com/counter-10mn_avc_dash.mp4" of the file and issue an HTTP request. At this time, the HTTP request is as follows:

GET /counter-10mn_avc_dash.mp4 HTTP/1.1
Host: example.com
Range: bytes=795-83596

FIG. 7 illustrates an example in which a structure below an MPD in a zapping MPD extended for zapping is described in an XML format.

In other words, in the extended zapping MPD, an MPD/@NTPSynchronized (a boolean type, and a value is true/false) attribute and an MPD/@SegmentAlignedGroupID (group identifier) attribute are newly introduced below the MPD.

True or false indicating whether or not the segment delimiter of the segment stream for the MPD is in synchronization with the NTP time axis is described in the MPD/@NTPSynchronized attribute. In this case, since the zapping segment streamer 63 operates in synchronization with the NTP time axis, the segment delimiters of the segment streams are matched on the NTP time axis. Thus, the value of the MPD/@NTPSynchronized attribute is true.

An identifier of a group to which channels in which the segment delimiters of the segment stream are matched is described in the MPD/@SegmentAlignedGroupID attribute.

Thus, the zapping MPD acquisition portal 70 preferably collects the MPD (the zapping MPD) in which the MPD/@NTPSynchronized attribute is true, and the MPD/@SegmentAlignedGroupID attribute is the same group identifier when the zapping MPD is requested from the terminal device 80. Between the channels corresponding to the collected zapping MPD, the segment delimiters are matched in synchronization with the NTP time axis, and thus rapid zapping is possible.

The query API used when the terminal device 80 requests the zapping MPD acquisition portal 70 to transmit the zapping MPD may be, for example, described as follows:

Http://MPDPortal.com/getMPDforZapping

Although not illustrated, in the zapping MPD, within the group to which the channels of the content supply devices 60 belong, the starting points (MPD/@availabilityStartTime+Period/@start) of the media reproduction times at the head of the segments are matched on the NTP time axis.

At least one of a segmentBase/@duration attribute storing a value indicating the segment length and an MPD/@maxSegmentDuration attribute storing a value indicating the largest segment length is described in the zapping MPD and the viewing MPD.

When one of them is described, the non-extended viewing MPD, that is, the viewing MPD in which the MPD/@NTPSynchronized attribute and the MPD/@SegmentAlignedGroupID attribute are not introduced, can be collected as a zapping MPD. Specifically, for example, when the terminal device 80 requests the zapping MPD acquisition portal 70 to transmit the MPD using the following query API, a viewing MPD of a segment length (an expected segment length) satisfying a predetermined condition can be collected. In the following example, the segment length of 2 seconds or less is used as the expected segment length.

Http://MPDPortal.com/getMPD?expectedSegmentSizeLimit="PT2S"

Between channels corresponding to the collected viewing MPD corresponding to the expected segment length, since the segment length is a relatively short time (2 seconds in the above example), the rapid zapping in which a possible extra delay is a very short time is possible.

Instead of introducing the MPD/@NTP Synchronized attribute and the MPD/@SegmentAlignedGroupID attribute, the MPD/forZapping (a boolean type, and a value is true/false) attribute indicating whether or not the zapping MPD is the zapping MPD may be introduced.

[Operation of Content Supply System 50]

Next, an operation of the content supply system 50 will be described.

FIG. 8 is a flowchart for describing a process (hereinafter, a pre-delivery process) that is performed by the content supply device 60 in advance in order to deliver content.

In step S1, the content supply devices 60 synchronize their system times with the NTP time axis according to the system time information provided from the NTP server 12. As a result, for example, the zapping segment streamer 63 of the content supply device 60A operates in synchronization with the NTP time axis.

In step S2, the channel server 61 generates a plurality of pieces of streaming data (one or more pieces of zapping streaming data and two or more pieces of viewing streaming data) having different bit rates from source data of content to be delivered as the channel A, and supplies the generated streaming data to the DASH server 62.

In step S3, the zapping segment streamer 63 generates a zapping segment stream by temporally delimiting each piece of zapping streaming data into periods and further dividing a period into segments having a duration (segment length) which is common within a group to which the content supply device 60 belongs, and holds the segments as a file. The zapping segment streamer 63 notifies the zapping MPD server 64 of the address serving as the supply source of the held file. In parallel to this operation, the viewing segment streamer 65 generates a viewing segment stream by temporally delimiting each piece of viewing streaming data into periods and further dividing a period into segments, and holds the segments as a file. The viewing segment streamer 65 notifies the viewing MPD server 66 of the address serving as the supply source of the held file.

In step S4, the zapping MPD server 64 generates the zapping MPD necessary when the terminal device 80 side receives the zapping segment stream. In step S5, the viewing MPD server 66 generates the viewing MPD necessary when the terminal device 80 side receives the viewing segment stream. The description of a pre-delivery process is now finished.

Figure 9:
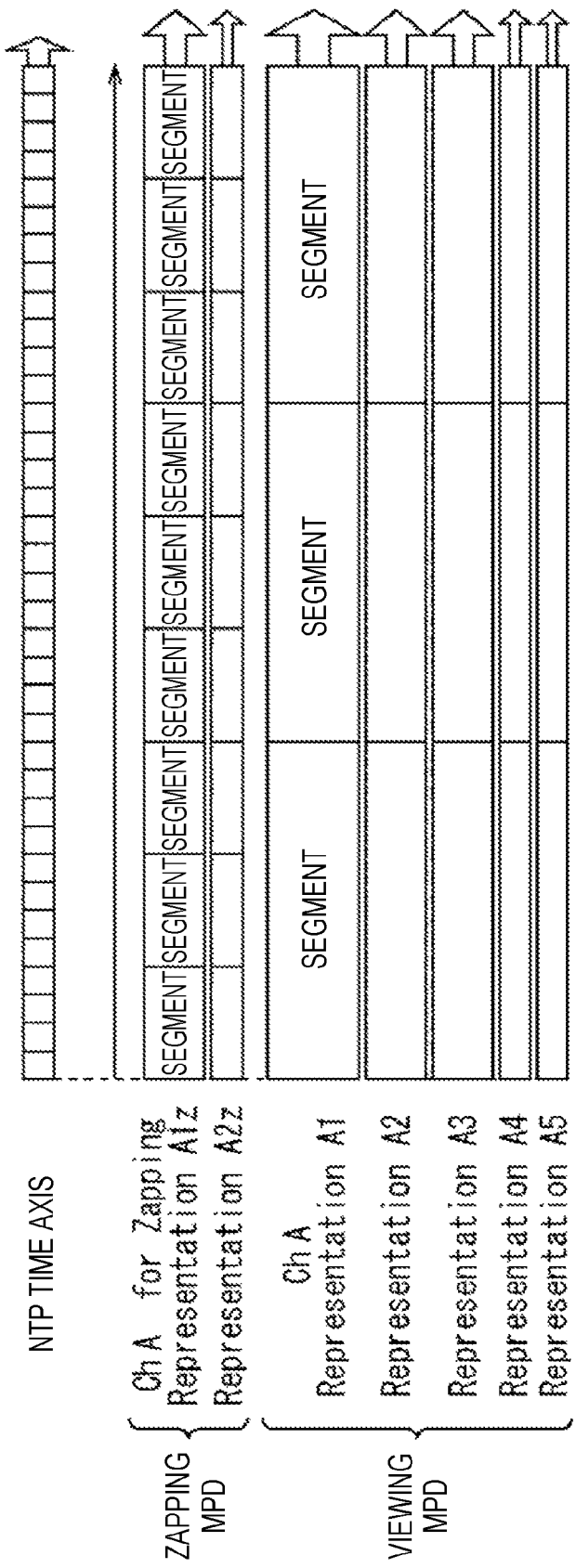
FIG. 9 is a diagram illustrating a difference between segment lengths of a zapping segment stream and a viewing segment stream.

FIG. 9 illustrates the segment delimiters of the zapping segment stream and the viewing segment stream generated by the pre-delivery process.

As illustrated in FIG. 9, in the content supply device 60A corresponding to the channel A, one or more (two in FIG. 9) zapping segment streams and two or more (five in FIG. 9) viewing segment streams are generated, and the segment delimiters thereof are synchronized with the NTP time axis.

The segment delimiter of the zapping segment stream matches the segment delimiter of the zapping segment stream (not illustrated) of another channel belonging to the same group.

The zapping segment stream is received based on the zapping MPD, and the viewing segment stream is received based on the viewing MPD.

Figure 10:
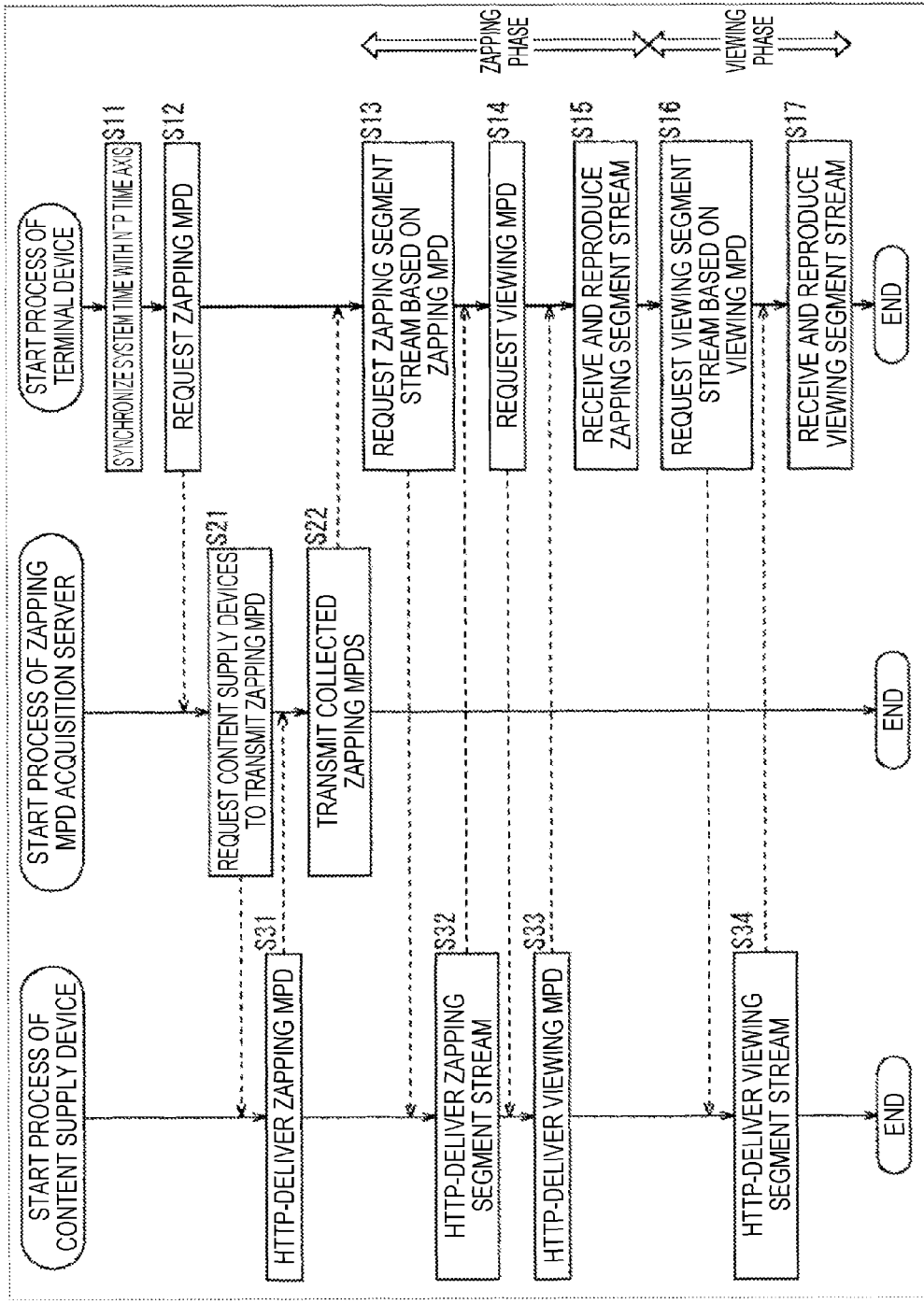
FIG. 10 is a flowchart for describing a series of processes of a content supply system.

FIG. 10 is a flowchart for describing a series of processes until the terminal device 80 transitions to a viewing phase through a zapping phase of content (hereinafter referred to as a series of processes).

In step S11, the terminal device 80 synchronizes its system time with the NTP time axis according to the system time information provided from the NTP server 12. In step S12, the terminal device 80 requests the zapping MPD acquisition portal 70 to transmit the zapping MPD. In other words, the terminal device 80 transmits the query API for requesting crawling of the zapping MPD.

In step S21, in response to the query API, the zapping MPD acquisition portal 70 is connected to the zapping MPD servers 64 of the content supply devices 60, and requests the zapping MPD servers 64 to transmit the zapping MPD (the MPD in which the MPD/@NTP Synchronized attribute is true, and the MPD/@SegmentAlignedGroupID attribute is the same group identifier). In step S31, in response to this request, the zapping MPD servers 64 of the content supply devices 60 HTTP-deliver the zapping MPD to the zapping MPD acquisition portal 70. In step S22, the zapping MPD acquisition portal 70 transmits the collected zapping MPDs to the terminal device 80 of the request source.

The terminal device 80 that has acquired the zapping MPDs enters the zapping phase. In step S13, the terminal device 80 requests the zapping segment streamer 63 of the content supply device 60 to transmit the zapping segment stream based on the zapping MPD. In step S32, in response to this request, the zapping segment streamer 63 HTTP-unicast-delivers the file of the requested zapping segment stream. In step S15, the terminal device 80 receives and reproduces the file of the zapping segment stream that is HTTP-unicast-delivered.

During the zapping phase, the terminal device 80 can perform rapid zapping between channels belonging to the same group by repeating the process of step S13 and step S15, when appropriate.

The terminal device 80 acquires the viewing MPD during the zapping phase. Specifically, in step S14, the terminal device 80 requests the viewing MPD servers 66 of the content supply devices 60 to transmit the viewing MPD, and receives the viewing MPDs that are HTTP-unicast-delivered by the viewing MPD servers 66 in step S33.

The terminal device 80 that has received the viewing MPD transitions from the zapping phase to the viewing phase.

In step S16, the terminal device 80 requests the viewing segment streamer 65 of the content supply device 60 to transmit the viewing segment stream based on the viewing MPD. In step S34, in response to this request, the viewing segment streamer 65 HTTP-unicast-delivers the file of the requested viewing segment stream. In step S17, the terminal device 80 receives and reproduces the file of the viewing segment stream that is HTTP-unicast-delivered.

Thereafter, transition from the viewing phase to the zapping phase can be performed, and transition to the viewing phase can be performed again. The description of the series of processes is now finished. According to a series of processes described above, it is possible to rapidly perform zapping between channels belonging to the same group without the occurrence of an extra delay.

Figure 11:
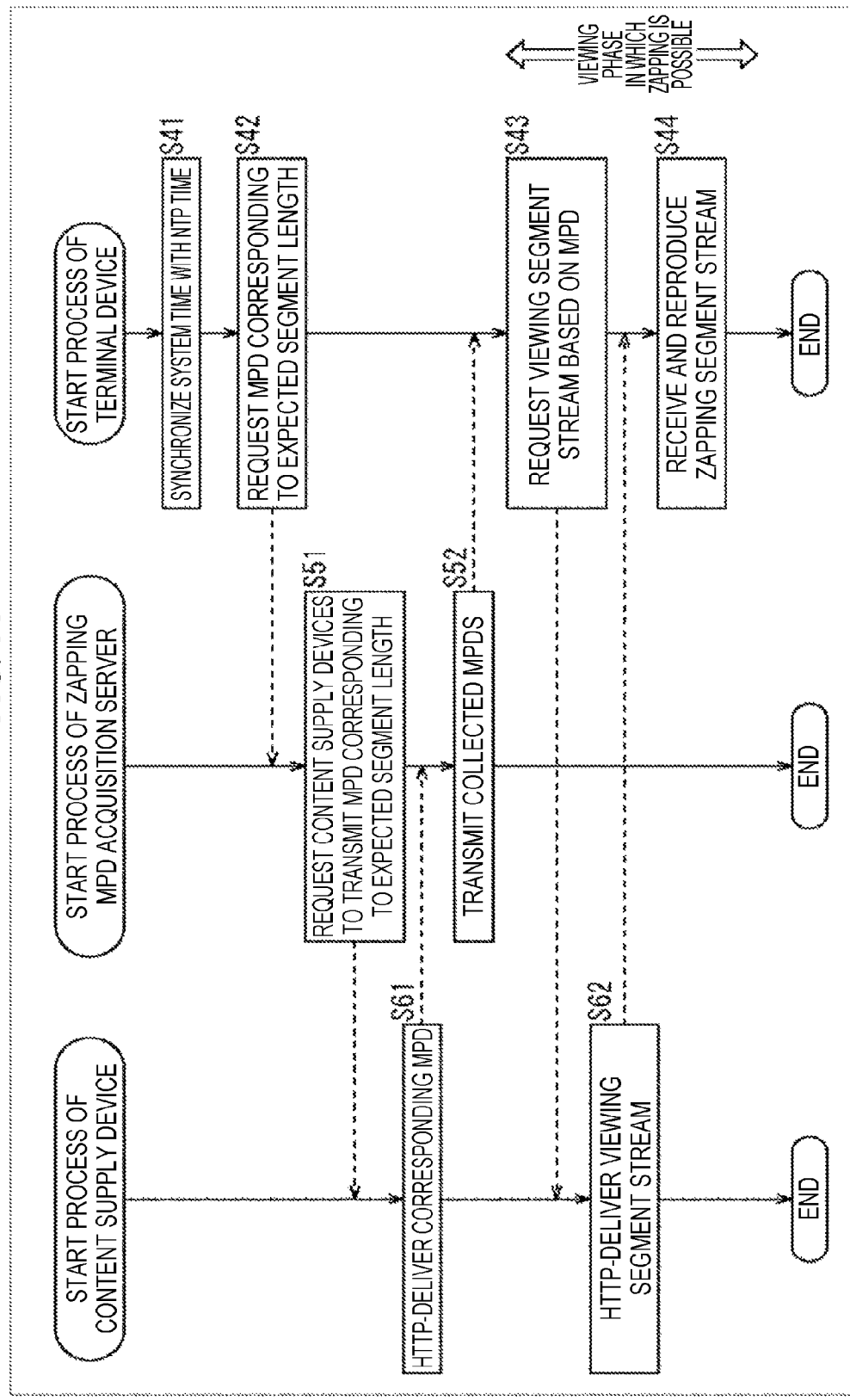
FIG. 11 is a flowchart for describing a modified example of a series of processes of a content supply system.

FIG. 11 is a flowchart for describing a modified example of the series of processes.

The modified example of FIG. 11 corresponds to an example in which the zapping segment streamer 63 and the zapping MPD server 64 are not provided in the content supply device 60, and the zapping MPD and the zapping segment stream are not provided.

In this case, a viewing segment stream having a segment length smaller than a designated duration (a viewing segment stream having an expected segment length among the viewing segment streams) based on the viewing MPD is used for zapping.

In step S41, the terminal device 80 synchronizes its system time with the NTP time axis according to the system time information provided from the NTP server 12. In step S42, the terminal device 80 requests the zapping MPD acquisition portal 70 to transmit the viewing MPD for receiving the viewing segment stream that can be used for zapping. In other words, the terminal device 80 transmits the query API for requesting crawling of the viewing MPD corresponding to the expected segment length.

In step S51, in response to the query API, the zapping MPD acquisition portal 70 is connected to the viewing MPD servers 66 of the content supply devices 60, and requests the viewing MPD servers 66 to transmit the viewing MPD (the MPD in which at least one of the segmentBase/@duration attribute and the MPD/@maxSegmentDuration attribute is equal to or less than the expected segment length) corresponding to the expected segment length. In step S61, in response to this request, the viewing MPD servers 66 of the content supply devices 60 HTTP-unicast-delivers the viewing MPD corresponding to the expected segment length to the zapping MPD acquisition portal 70. In step S52, the zapping MPD acquisition portal 70 transmits the collected to viewing MPDs to the terminal device 80 of the request source.

The terminal device 80 that has received the viewing MPD corresponding to the expected segment length enters the viewing phase in which rapid zapping is possible.

In step S43, the terminal device 80 requests the viewing segment streamer 65 of the content supply device 60 to transmit the viewing segment stream based on the viewing MPD. In step S62, in response to this request, the viewing segment streamer 65 HTTP-unicast-delivers the file of the requested viewing segment stream. In step S44, the terminal device 80 receives and reproduces the file of the viewing segment stream that is HTTP-unicast-delivered. The description of the series of processes is now finished.

According to the modified example of the series of processes, it is possible to rapidly switch or zap a plurality of viewing segment streams having a relatively small segment length.

[Combination of Zapping MPD and Viewing MPD]

In the present embodiment described above, the zapping segment stream and the viewing segment stream of the same channel are received based on the zapping MPD and the viewing MPD, respectively. The zapping MPD and the viewing MPD of the same channel are associated based on a URL of an acquisition destination or the like, but a zapping-viewing combined MPD in which the zapping MPD and the viewing MPD are combined may be generated and delivered.

AdaptationSet of (the representation of) the zapping segment stream and AdaptationSet of (the representation of) the viewing segment stream delivered by the channel A are described in the zapping-viewing combined MPD.

However, in the current MPD regulation, it is merely guaranteed that a group of representations within AdaptationSet can be switched, and although a group of representations within AdaptationSet can be switched since the segment delimiters match each other, an attribute for indicating it is not defined.

In this regard, an unsymmetricallyAlignedGroupFrom attribute and an unsymmetricallyAlignedGroupTo attribute are newly introduced below AdaptationSet in the zapping-viewing combined MPD in order to describe a state in which AdaptationSets are aligned (however, switching can be performed asymmetrically in one direction rather than mutual switching in which the segment length sizes are matched.)

It is possible to identify a group of AdaptationSets that are asymmetrically aligned based on the unsymmetricallyAlignedGroupFrom attribute and the unsymmetricallyAlignedGroupTo attribute. A definition of From/To indicates that switching is possible (an alignment is performed) from a From side to a To side.

Figure 12:
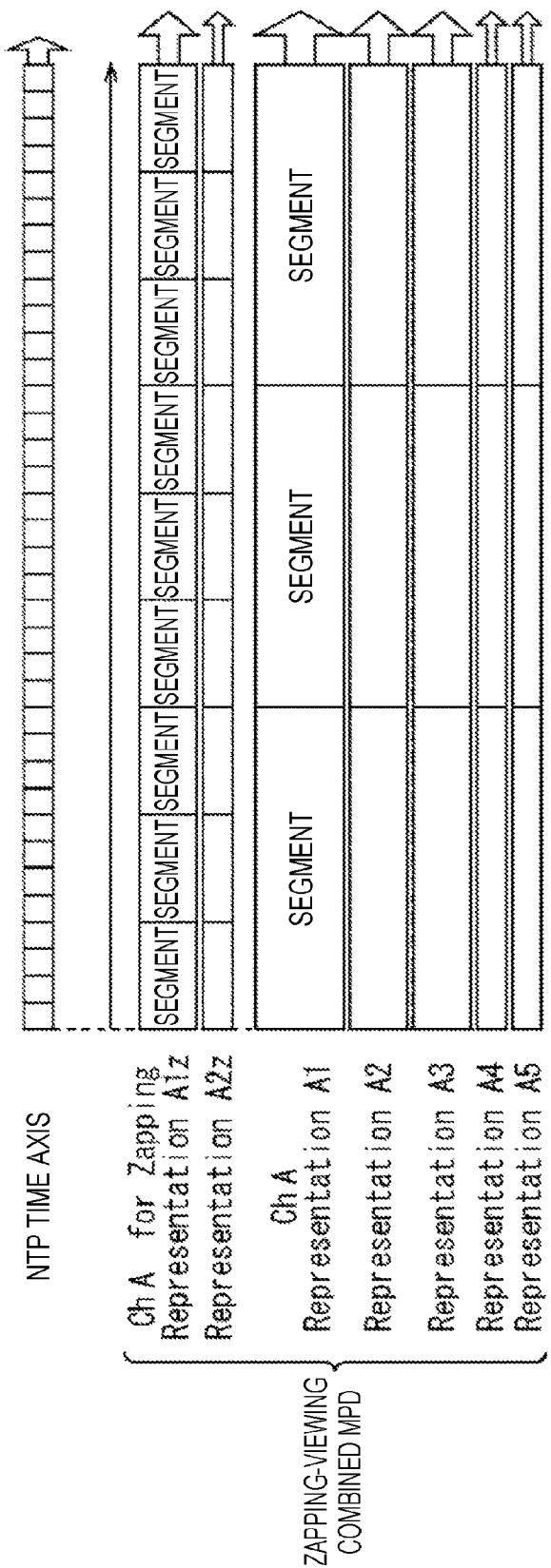
FIG. 12 is a diagram illustrating an exemplary combination of a segment length of a zapping segment stream and a segment length of a viewing segment stream.

FIG. 12 illustrates an example in which the segment length of the viewing segment stream delivered through the channel A is three times as large as a segment of the zapping segment stream. In this case, asymmetric switching is possible in only one direction from the viewing segment stream to the zapping segment stream, and information indicating it is described in the zapping-viewing combined MPD.

FIG. 13 illustrates an exemplary zapping-viewing combined MPD corresponding to FIG. 12.

In other words, AdaptationSet of viewing segment streams A1 to A5 is included in unsymmetricallyAlignedGroupFrom, and AdaptationSet of zapping segment streams A1z and A2z is included in unsymmetricallyAlignedGroupTo, and both sets belong to the same group Ax.

Figure 14:
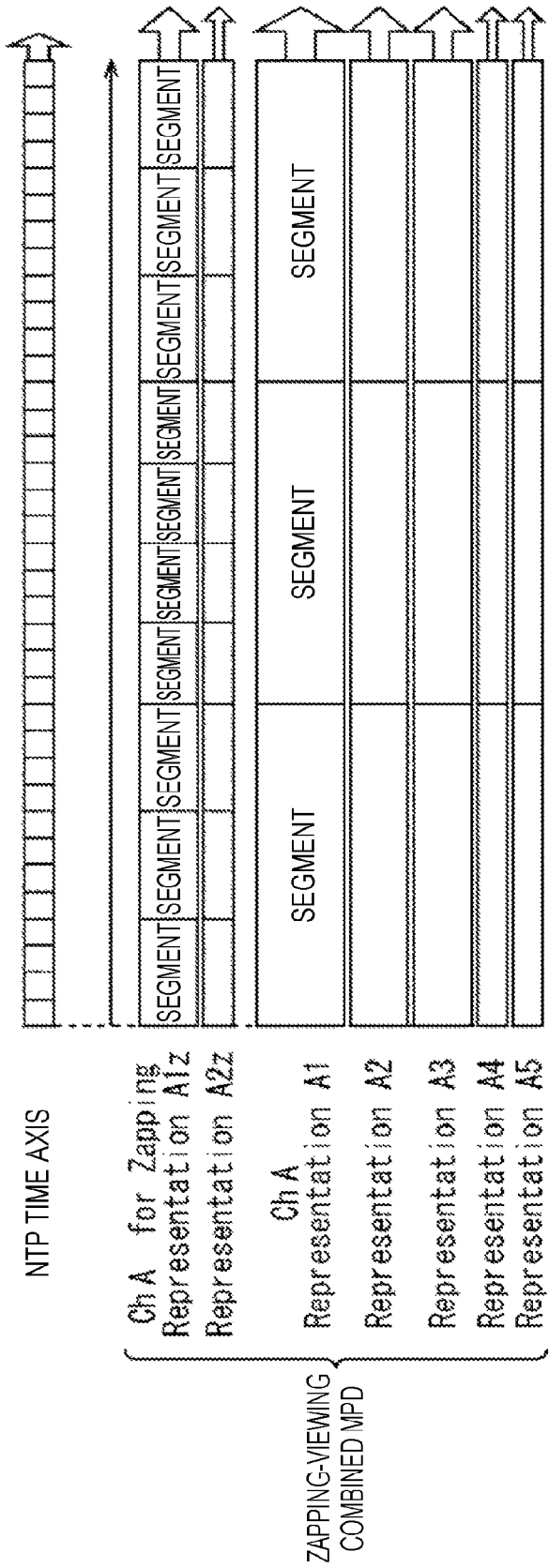
FIG. 14 is a diagram illustrating an exemplary combination of a segment length of a zapping segment stream and a segment length of a viewing segment stream.

FIG. 14 illustrates an example in which the segment length of the viewing segment streams delivered through the channel A is three or four times as large as a segment of the zapping segment stream. In this case, asymmetric switching is possible in only one direction from the viewing segment stream to the zapping segment stream, and information indicating it is described in the zapping-viewing combined MPD.

A zapping-viewing combined MPD corresponding to FIG. 14 is similar to that illustrated in FIG. 13, and an illustration thereof is omitted.

Figure 15:
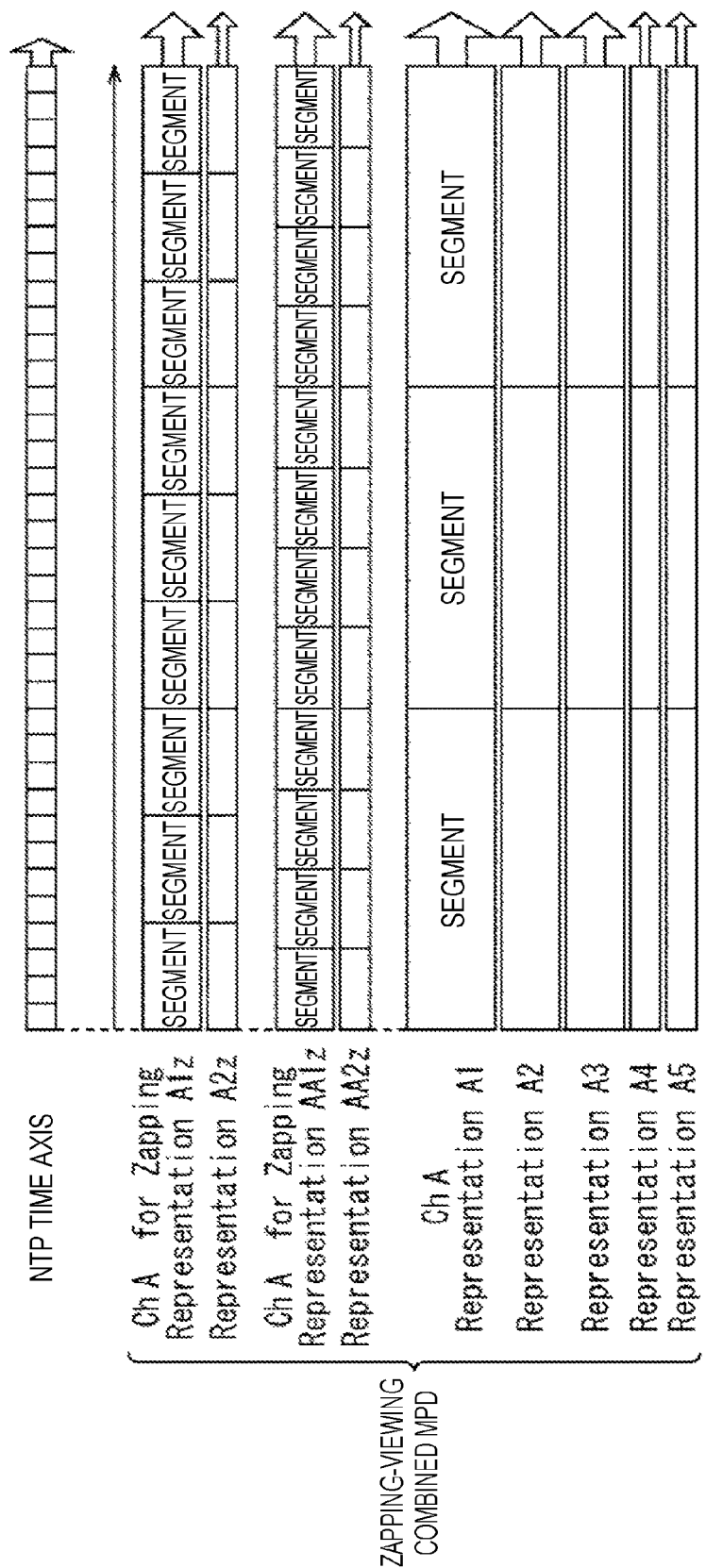
FIG. 15 is a diagram illustrating an exemplary combination of a segment length of a zapping segment stream and a segment length of a viewing segment stream.

FIG. 15 illustrates an example in which four zapping segment streams and five viewing segment streams are delivered through the channel A, every two zapping segment streams are aligned, and the segment length of the viewing segment stream is three or four times as large as a segment of the zapping segment stream. In this case, asymmetric switching is possible in only one direction from the viewing segment stream to the zapping segment stream, and information indicating it is described in the zapping-viewing combined MPD.

FIG. 16 is an exemplary zapping-viewing combined MPD corresponding to FIG. 15.

In other words, AdaptationSet of viewing segment streams A1 to A5 is included in symmetricallyAlignedGroupFrom, and AdaptationSet of zapping segment streams A1z and A2z and AdaptationSet of zapping segment streams AA1z and AA2z are included in unsymmetricallyAlignedGroupTo, and both sets belongs to the same group Ax.

Using the zapping-viewing combined MPD, the content supply device 60 need not manage a correspondence relation between the zapping MPD and the viewing MPD. Moreover, the terminal device 80 need not acquire the zapping MPD and the viewing MPD individually, and seamless switching is possible between the zapping segment stream and the viewing segment stream of the same channel.

In the above description, switching between channels in DASH is performed in units of segments, but switching between channels may be performed in units of sub segments obtained by subdividing the segments. In this case, preferably, an MPD/@SubSegmentDuration attribute storing a value indicating a sub segment length is mandatorily described in the zapping MPD and the viewing MPD, and "segment" in the above description is replaced with "sub segment."

By the way, each of the content supply device 60 and the terminal device 80 that execute a series of processes described above can be configured with hardware or can be implemented by executing software through a computer. Examples of the computer include a computer embedded in dedicated hardware and a general-purpose personal computer capable of installing various kinds of programs and executing various kinds of functions.

Figure 17:
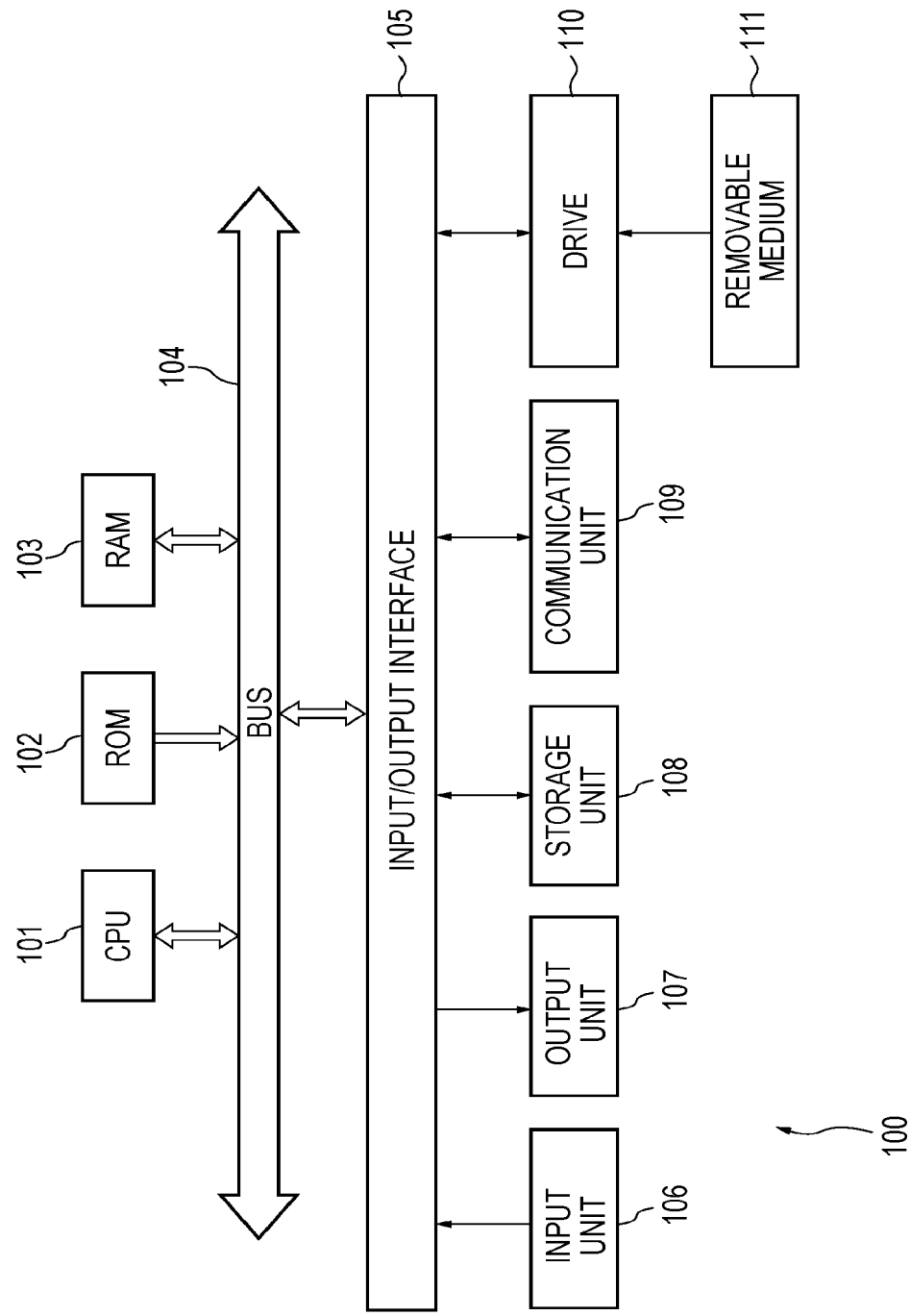
FIG. 17 is a block diagram illustrating an exemplary configuration of a computer.

FIG. 17 is a block diagram illustrating an exemplary hardware configuration of the computer.

In a computer 100, a central processing unit (CPU) 101, a read only memory (ROM) 102, and a random access memory (RAM) 103 are connected with one another via a bus 104.

An input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface. The drive 110 drives a removable medium 111 such as a magnetic disk, an optical disk, a magneto-optical disk, or a semiconductor memory.

In the computer 100 having the above-described configuration, for example, a series of processes described above are performed by loading a program stored in the storage unit 108 onto the RAM 103 through the input/output interface 105 and the bus 104 and executing the loaded program through the CPU 101.

For example, the program executed by the computer 100 (the CPU 101) may be recorded in the removable medium 111 serving as a package medium or the like and provided. The program may be provided via a wired or wireless transmission medium such as a local area network, the Internet, or digital satellite broadcasting.

In the computer 100, the removable medium 111 may be mounted on the drive 110, and the program may be installed in the storage unit 108 through the input/output interface 105. The program may be received by the communication unit 109 via a wired or wireless transmission medium and installed in the storage unit 108. Moreover, the program may be installed in the ROM 102 or the storage unit 108 in advance.

Further, the program executed by the computer 100 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)

A content supply device that supplies a plurality of pieces of streaming data that include content of a same subject and differ in bit rate through a same channel, according to an adaptive streaming technique, the content supply device including:

a first supply unit configured to generate a zapping stream by delimiting the streaming data according to a timing and a duration in common with another channel and to supply the zapping stream to a reception side via a network;

a second supply unit configured to generate a viewing stream by delimiting the streaming data according to a duration of an integer multiple of the duration of the zapping stream and to supply the viewing stream to the reception side via the network; and a metafile generating unit configured to generate a metafile that is for the reception side to receive the zapping stream and the viewing stream.

(2)

The content supply device according to (1), wherein the metafile generating unit generates the metafile including an attribute indicating that a minimum unit of the zapping stream is aligned with a minimum unit of the viewing stream.

(3)

The content supply device according to (1) or (2), wherein the metafile generating unit generates the metafile including an attribute indicating that a minimum unit of the viewing stream is asymmetrically aligned with a minimum unit of the zapping stream.

(4)

The content supply device according to any of (1) to (3), wherein the metafile generating unit generates an extended MPD by introducing an attribute indicating that AdaptationSet corresponding to the viewing stream is asymmetrically aligned with AdaptationSet corresponding to the zapping stream.

(5)

The content supply device according to (4), wherein the attribute includes AdaptationSet/@unsymmetricallyAlignedGroupFrom and AdaptationSet/@unsymmetricallyAlignedGroupFrom To

REFERENCE SIGNS LIST

11 Internet
12 NTP server
50 content supply system
60 content supply device
61 channel server
62 DASH server
63 zapping segment streamer
64 zapping MPD server
65 viewing segment streamer
66 viewing MPD server
70 zapping MPD acquisition server
80 terminal device
100 computer
101 CPU

The invention claimed is:

1. A content supply device that supplies a plurality of pieces of streaming data that include content of a same subject and differ in bit rate through a same channel, according to an adaptive streaming technique, the content supply device comprising:

processing circuitry configured to generate a zapping stream by delimiting the streaming data according to a timing and a duration in common with another channel and to supply the zapping stream to a reception side via a network, generate a viewing stream by delimiting the streaming data according to a duration of an integer multiple of the duration of the zapping stream and to supply the viewing stream to the reception side via the network; and generate a metafile that is for the reception side to receive the zapping stream and the viewing stream, wherein the metafile includes a media presentation description, and the circuitry is configured to generate the media presentation description by introducing an attribute indicating that an adaptation set corresponding to the viewing stream is asymmetrically aligned with an adaptation set corresponding to the zapping stream.

2. The content supply device according to claim 1, wherein the circuitry is configured to generate the metafile including an attribute indicating that a unit of the zapping stream s aligned with a unit of the viewing stream.

3. The content supply device according to claim 2, wherein the circuitry is configured to generate the metafile including an attribute indicating that a unit of the viewing stream is asymmetrically aligned with a unit of the zapping stream.

4. The content supply device according to claim 1, wherein the attribute includes AdaptationSet/@unsymmetricallyAlignedGroupFrom and AdaptationSet/@unsymmetricallyAlignedGroupFromTo.

5. A content supply method of a content supply device that supplies a plurality of pieces of streaming data that include content of a same subject and differ in bit rate through a same channel, according to an adaptive streaming technique, the content supply method comprising:

generating, by the content supply device, a zapping stream by delimiting the streaming data according to a timing and a duration in common with another channel and supplying the zapping stream to a reception side via a network;

generating, by the content supply device, a viewing stream by delimiting the streaming data according to a duration of an integer multiple of the duration of the zapping stream and supplying the viewing stream to the reception side via the network; and generating, by the content supply device, a metafile that is for the reception side to receive the zapping stream and the viewing stream, wherein the metafile includes a media presentation description, which is generated by the content supply device by introducing an attribute indicating that an adaptation set corresponding to the viewing stream is asymmetrically aligned with an adaptation set corresponding to the zapping stream.

6. A non-transitory computer-readable medium including a program causing a computer that supplies a plurality of pieces of streaming data that include content of a same subject and differ in bit rate through a same channel, according to an adaptive streaming technique to:

generate a zapping stream by delimiting the streaming data according to a timing and a duration in common with another channel and to supply the zapping stream to a reception side via a network;

generate a viewing stream by delimiting the streaming data according to a duration of an integer multiple of the duration of the zapping stream and to supply the viewing stream to the reception side via the network; and generate a metafile that is for the reception side to receive the zapping stream and the viewing stream, wherein the metafile includes a media presentation description, which is generated by introducing an attribute indicating that an adaptation set corresponding to the viewing stream is asymmetrically aligned with an adaptation set corresponding to the zapping stream.

7. A receiving device that receives a plurality of pieces of streaming data including content of a same subject and differing in bit rate, the receiving device comprising:

circuitry configured to receive a zapping stream, which was generated by delimiting the streaming data according to a timing and a duration in common with a channel other than a channel via which the streaming data is transmitted;

receive a viewing stream, which was generated by delimiting the streaming data according to a duration longer than the duration of the zapping stream; and receive a metafile that is for receiving the zapping stream and the viewing stream, wherein the metafile includes a media presentation description including an attribute indicating that an adaptation set corresponding to the viewing stream is asymmetrically aligned with an adaptation set corresponding to the zapping stream.

8. The receiving device according to claim 7, wherein the metafile includes an attribute indicating that a unit of the zapping stream is aligned with a unit of the viewing stream.

9. The receiving device according to claim 7, wherein the metafile includes an attribute indicating that a unit of the zapping stream is asymmetrically aligned with a unit of the viewing stream.

10. The receiving device according to claim 7, wherein the receiving device switches reception of the zapping stream and the viewing stream supplied through the channel via which the streaming data is transmitted based on the acquired metafile.

11. A content supply system comprising:

a content supply device configured to supply a plurality of pieces of streaming data that include content of a same subject and differ in bit rate through a same channel, according to an adaptive streaming technique; and a terminal device configured to receive the streaming data, wherein the content supply device includes circuitry configured to generate a zapping stream by delimiting the streaming data, according to a timing and a duration in common with another channel and to supply the zapping stream to the terminal device via a network, generate a viewing stream by delimiting the streaming data according to a duration of an integer multiple of the duration of the zapping stream and to supply the viewing stream to the terminal device via the network, and generate a metafile that is for the terminal device to receive the zapping stream and the viewing stream, wherein the metafile includes a media presentation description, and the circuitry is configured to generate the media presentation description by introducing an attribute indicating that an adaptation set corresponding to the viewing stream is asymmetrically aligned with an adaptation set corresponding to the zapping stream, and the terminal device is configured to acquire the metafile, and to receive the zapping stream and the viewing stream supplied through the same channel, based on the acquired metafile.

12. A receiving method comprising:

receiving a zapping stream, which was generated by delimiting a streaming data according to a timing and a duration in common with a channel other than a channel via which the streaming data is transmitted, the streaming data including content of a same subject and differing in bit rate;

receiving a viewing stream, which was generated by delimiting the streaming data according to a duration longer than the duration of the zapping stream; and receiving a metafile that is for receiving the zapping stream and the viewing stream, wherein the metafile includes a media presentation description including an attribute indicating that an adaptation set corresponding to the viewing stream is asymmetrically aligned with an adaptation set corresponding to the zapping stream.

13. The receiving method of claim 12, further comprising switching reception of the zapping stream and the viewing stream supplied through the channel via which the streaming data is transmitted based on the acquired metafile.

14. The receiving method of claim 12, wherein the metafile includes an attribute indicating that a unit of the zapping stream is aligned with a unit of the viewing stream.

15. The receiving method of claim 12, wherein the metafile includes an attribute indicating that a unit of the zapping stream is asymmetrically aligned with a unit of the viewing stream.

16. A non-transitory computer-readable medium having stored thereon computer-readable instructions which when executed by a computer cause the computer to perform a method comprising:

receiving a zapping stream, which was generated by delimiting a streaming data according to a timing and a duration in common with a channel other than a channel via which the streaming data is transmitted, the streaming data including content of a same subject and differing in bit rate;

receiving a viewing stream, which was generated by delimiting the streaming data according to a duration longer than the duration of the zapping stream; and receiving a metafile that is for receiving the zapping stream and the viewing stream, wherein the metafile includes a media presentation description including an attribute indicating that an adaptation set corresponding to the viewing stream is asymmetrically aligned with an adaptation set corresponding to the zapping stream.

* * * * *

UNITED STATES PATENT AND TRADEMARK OFFICE
CERTIFICATE OF CORRECTION

PATENT NO. : 10,171,854 B2
APPLICATION NO. : 14/785965
DATED : January 1, 2019
INVENTOR(S) : Yasuaki Yamagishi It is certified that error appears in the above-identified patent and that said Letters Patent is hereby corrected as shown below:

In the Claims

Column 16, Line 23, "network," should read --network;--
Column 16, Line 43, "s" should read --is--

Signed and Sealed this
Twenty-fifth Day of April, 2023

Katherine Kelly Vidal
*Director of the United States Patent and Trademark Office*